(12) United States Patent
Filev et al.

(10) Patent No.: US 8,930,116 B2
(45) Date of Patent: Jan. 6, 2015

(54) ON-BOARD REAL-TIME SPEED CONTROL SETPOINT VARIATION USING STOCHASTIC OPTIMIZATION

(71) Applicants: Ford Global Technologies, LLC, Dearborn, MI (US); The Regents of the University of Michigan, Ann Arbor, MI (US)

(72) Inventors: Dimitar P. Filev, Novi, MI (US); Ilya Kolmanovsky, Novi, MI (US); Kevin McDonough, Ann Arbor, MI (US); Steven J. Szwabowski, Northville, MI (US); John O. Michelini, Sterling Heights, MI (US); Diana Yanakiev, Birmingham, MI (US); Mahmoud Abou-Nasr, Canton, MI (US)

(73) Assignees: Ford Global Technologies, LLC, Dearborn, MI (US); The Regents of the University of Michigan, Ann Arbor, MI (US)

( * ) Notice: Subject to any disclaimer, the term of this patent is extended or adjusted under 35 U.S.C. 154(b) by 139 days.

(21) Appl. No.: 13/777,049

(22) Filed: Feb. 26, 2013

(65) Prior Publication Data
US 2014/0244130 A1 Aug. 28, 2014

(51) Int. Cl.
*B60K 31/00* (2006.01)
*B60W 50/00* (2006.01)
*B60W 30/14* (2006.01)

(52) U.S. Cl.
CPC ............ *B60K 31/00* (2013.01); *B60W 50/0097* (2013.01); *B60W 30/143* (2013.01); *B60K 2310/244* (2013.01); *B60W 2050/0083* (2013.01); *B60W 2550/142* (2013.01); *B60W 2550/20* (2013.01); *B60W 2550/402* (2013.01)
USPC .............................................. 701/96; 701/94

(58) Field of Classification Search
CPC ...... B60K 31/00; B60K 31/18; B60K 31/185; G01C 21/00; G01C 21/26; G05D 1/02
USPC ............ 701/93–96, 400, 408, 409, 423, 448, 701/450, 461, 300, 301; 180/170–179
See application file for complete search history.

(56) References Cited

U.S. PATENT DOCUMENTS 5,933,100 A   8/1999   Golding
6,321,162 B1  11/2001  Hessing
(Continued)

FOREIGN PATENT DOCUMENTS

GB   2480877 A   7/2011

OTHER PUBLICATIONS

Lin, et al., "A stochastic control strategy for hybrid electric vehicles," American Control Conference, 2004. Proceedings of the 2004, vol. 5, No., pp. 4710-4715 vol. 5, Jun. 30, 2004-Jul. 2, 2004.
(Continued)

*Primary Examiner* — Richard Camby
(74) *Attorney, Agent, or Firm* — Gregory P. Brown; MacMillan, Sobanski & Todd, LLC

(57) ABSTRACT

Vehicle apparatus adjusts a vehicle powertrain of the vehicle in response to a speed setpoint. An optimizer selects a control policy to periodically generate speed adjustments for applying to the speed setpoint to operate at increased efficiency. The control policy is based on a value function providing an optimized solution for a cost model and a transition probability model. The transition probability model corresponds to a driving state defined according to a plurality of dimensions including a time-of-day dimension and a geographic region dimension. The transition probability model and the control policy have inputs based on road grade and speed. The optimizer collects road grade data during routine driving of the vehicle to construct a observed transition probability model and uses divergence between the observed transition probability model and a set of predetermined transition probability models to identify a control policy for use during the routine driving.

15 Claims, 9 Drawing Sheets

(56) References Cited

U.S. PATENT DOCUMENTS

| | | | |
|---|---|---|---|
| 6,374,173 | B1 | 4/2002 | Ehlbeck |
| 6,480,783 | B1 | 11/2002 | Myr |
| 6,990,401 | B2 | 1/2006 | Neiss et al. |
| 7,289,039 | B2 | 10/2007 | Kato et al. |
| 7,383,154 | B2 | 6/2008 | Tate, Jr. |
| 7,440,843 | B2 | 10/2008 | Yoshikawa et al. |
| 7,706,966 | B2 * | 4/2010 | Tomita et al. ............ 701/117 |
| 7,774,123 | B2 | 8/2010 | Schröder |
| 7,859,392 | B2 | 12/2010 | McClellan et al. |
| 7,899,610 | B2 | 3/2011 | McClellan |
| 8,023,883 | B1 * | 9/2011 | Lee et al. ............ 455/3.02 |
| 8,060,606 | B2 | 11/2011 | Friedman et al. |
| 8,265,850 | B2 | 9/2012 | Shin |
| 8,825,369 | B2 * | 9/2014 | Jin ............ 701/400 |
| 2007/0265759 | A1 | 11/2007 | Salinas et al. |
| 2008/0114521 | A1 | 5/2008 | Doering |
| 2009/0271084 | A1 | 10/2009 | Taguchi |
| 2009/0276135 | A1 | 11/2009 | Hagemann et al. |
| 2010/0204896 | A1 | 8/2010 | Biondo et al. |
| 2012/0176234 | A1 | 7/2012 | Taneyhill et al. |
| 2012/0197504 | A1 | 8/2012 | Sujan et al. |
| 2012/0239282 | A1 | 9/2012 | Taguchi |

OTHER PUBLICATIONS

Kolmanovsky, et al., "Stochastic optimal control of systems with soft constraints and opportunities for automotive applicants," Control Applications, (CCA) & Intelligent Control, (ISIC), 2009 IEEE, vol., No., pp. 1265-1270, Jul. 8-10, 2009.

Kolmanovsky, et al., Terrain and Traffic Optimized Vehicle Speed Control, 2010, pp. 378-383.

Filev, et al., "A generalized Markov Chain modeling approach for on board applications," Neural Networks (IJCNN), The 2010 International Joint Conference on , vol., No., pp. 1-8, Jul. 18-23, 2010.

McDonough, et al., "Modeling of vehicle driving conditions using transition probability models," Control Applications (CCA), 2011 IEEE International Conference on, vol., No., pp. 544-549, Sep. 28-30, 2011.

Desjardins, et al., Cooperative Adaptive Cruise Control: A Reinforcement Learning Approach, IEEE Transactions on Intelligent Transporation Systems, vol. 12, No. 4, Dec. 2011, pp. 1248-1260.

McDonogh, et al., "Stochastic dynamic programming control policies for fuel efficient in-traffic driving," American Control Conference (ACC), 2012, vol., No., pp. 3986-3991, Jun. 27-29, 2012.

* cited by examiner

ON-BOARD REAL-TIME SPEED CONTROL SETPOINT VARIATION USING STOCHASTIC OPTIMIZATION

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to vehicle speed control systems, and, more specifically, to optimizing energy efficiency of a speed-controlled vehicle without advance knowledge of actual road grade variations along a route of travel or any pre-planning of a route.

Vehicle manufacturers continually strive to minimize energy consumption for driving a vehicle (e.g., maximizing the distance driven per unit of gas for a gasoline vehicle or unit of electrical charge for an electrically-driven vehicle). Important influences on efficiency include the speed at which the vehicle is driven, road grade variations over the driven route, and traffic conditions. Automatic speed control (i.e., cruise control) systems can have a beneficial impact on fuel economy by reducing the amount of time spent accelerating the vehicle, especially during highway driving. Maintaining a single speed setting during uphill and downhill road grades, however, consumes more fuel than if the vehicle is allowed to vary in order to take advantage of road grade variations to optimize fuel consumption. If upcoming changes in road grade are known in advance (such as from GPS-based maps and advance routing), then temporary offsets can be introduced in the speed setting that accordingly improve energy consumption. However, GPS navigation devices and the necessary in-vehicle map data, computational, and/or remote data communications requirements to determine such offsets in real-time on-board a vehicle represent a significant cost or may be unavailable in some areas. Therefore, it would be desirable to lessen such requirements for determining appropriate speed offsets.

The paper Kolmanovsky et al., *Terrain and Traffic Optimized Vehicle Speed Control*, 6TH IFAC SYMPOSIUM ADVANCES IN AUTOMOTIVE CONTROL, MUNICH, JULY 2010, which is incorporated herein by reference, describes the derivation of a control policy for use by a vehicle in a specific geographic region for best on-average performance without advance knowledge of a route to be traveled or the actual upcoming road grade being approached. The control policy prescribes a vehicle speed setpoint to achieve optimal tradeoff between expected average fuel economy and expected average travel speed. Terrain and traffic properties (i.e., driving conditions) are aggregated as transition probability matrices (TPM) of a Markov Chain model. Stochastic dynamic programming generates the control policy off-line (i.e., off-board the vehicle during the design phase of the vehicle using independent characterization of the terrain) based on a value function which is included as a terminal cost in the optimization of another cost function that reflects predicted fuel consumption and speed. The resulting control policy is then loaded into the vehicle for use when it is driven in the corresponding region.

The paper McDonough et al., *Modeling of Vehicle Driving Conditions Using Transition Probability Models*, 2011 IEEE MULTI-CONFERENCE ON CONTROL APPLICATIONS, DENVER, SEPTEMBER 2011, which is incorporated herein by reference, discloses the use of Kullback-Leibeler (KL) divergence between transition probability matrices to differentiate between similar or dissimilar driving conditions. Based on a TPM corresponding to a vehicle's current driving conditions, KL divergence could be used to interpolate control policies developed for a discrete set of typical driving cycles for adaptation of vehicle powertrain operation to the terrain and traffic conditions.

The proposed systems depend heavily upon a priori data collection (to characterize various regions and driving conditions) and analysis (to create the control policies to be preloaded into target vehicles). A more practical approach is needed for deploying optimizations across a large and diverse fleet of vehicle models being driven over a diverse set of regions and driving conditions. Furthermore, it would be desirable to increase the robustness of the optimization by better selection of the properties that are used to characterize the underlying driving conditions.

SUMMARY OF THE INVENTION

In one aspect of the invention, a vehicle apparatus comprises a speed control for adjusting a vehicle powertrain of the vehicle in response to a speed setpoint. An optimizer selects a control policy to periodically generate speed adjustments for applying to the speed setpoint to operate the vehicle powertrain at increased efficiency. The control policy is based on a value function providing an optimized solution for a cost model and a transition probability model. The transition probability model corresponds to a driving state defined according to a plurality of dimensions including a time-of-day dimension and a geographic region dimension. The transition probability model and the control policy have inputs based on road grade and speed. The optimizer collects road grade data during routine driving of the vehicle to construct an observed transition probability model and uses divergence between the observed transition probability model and a set of predetermined transition probability models to identify a control policy for use during the routine driving.

DETAILED DESCRIPTION OF PREFERRED EMBODIMENTS

Figure 1:
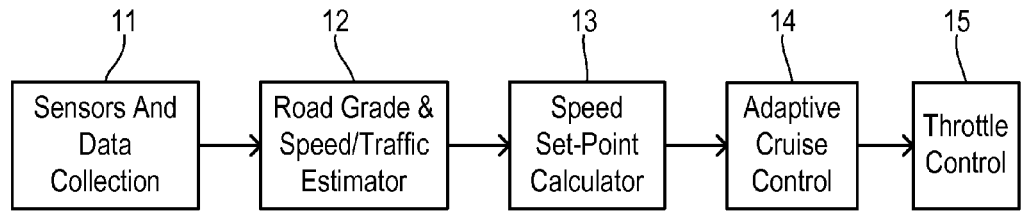
FIG. 1 is a block diagram of a vehicle apparatus of the invention.

Referring now to FIG. 1, a vehicle apparatus 10 includes various components for implementing a speed advisory and/or control system for achieving improved fuel economy. A sensors and data collection block 11 uses commonly available devices and interconnections to supply and communicate various items of information as described below. A block 12 is a road grade and speed/traffic estimator that characterizes the current driving conditions of the vehicle for use by a speed set-point calculator 13. Road grade may be determined by GPS measurements, by using other sensors such as an inclinometer or pitch sensor or calculated from accelerometer measurements, or by estimating it from other commonly available vehicle data such as from load and vehicle speed information provided by the powertrain control strategy. Speed or density of surrounding traffic can be measured using a radar or camera that may be provided as part of an adaptive cruise control system or vehicle guidance system, or may be obtained from an off-board information source via a wireless data network, for example. Calculator 13 implements a control policy that determines periodic changes to a speed set-point which are communicated to an adaptive cruise control block 14. Block 14 compares actual vehicle speed with the speed set-point and sends corresponding commands to a throttle control 15 (in the case of a spark-ignited internal combustion engine).

Figure 2:
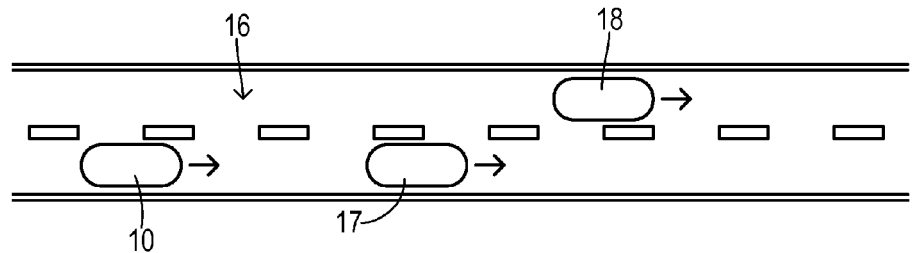
FIG. 2 is a diagram showing a roadway carrying traffic around a host vehicle.

FIG. 2 depicts a driving situation in which host vehicle 10 is traveling on a roadway 16 behind a lead vehicle 17 and in the presence of other traffic 18. In a conventional non-adaptive cruise control, vehicle 10 may follow an operator determined speed set-point until it is deactivated by the operator. In an adaptive cruise control, vehicle 10 may detect the presence of vehicle 17 and then reduce the speed set-point to prevent a close approach to lead vehicle 17. With either type of conventional cruise control, a particular speed set-point may be followed without regard to optimizing fuel economy which is affected by variations in road grade and/or traffic conditions as the vehicle travels.

Figure 3:
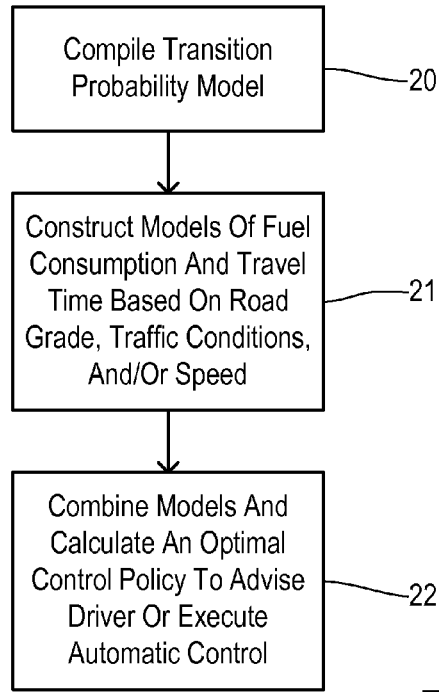
FIG. 3 is a block diagram showing a basic modeling process underlying the invention.

FIG. 3 shows an approach to vehicle control wherein an optimized speed profile can be generated which improves fuel efficiency. The approach is known as a stochastic optimal control that applies stochastic dynamic programming (SDP) to models of fuel consumption, travel time and following distance, and the various grade and traffic conditions that affect efficiency, time, and following distance. Thus, in a step 20 a transition probability model is made as a characterization of the predictable patterns in traffic speed and road grade for a particular region. Models of fuel consumption (e.g., for a particular model of vehicle) and travel time to reach a destination are constructed in step 21 based on road grade, a driver specified vehicle speed setpoint, traffic speed and other conditions. Using stochastic dynamic programming (SDP), the models are combined and an optimal control policy is calculated which can control the speed set-point in order to obtain a best average performance of fuel efficiency and travel time.

Based on the control policy, a vehicle control system can either advise the driver to follow the specified speed changes or execute automatic control of the speed setpoint of the cruise control system.

A benefit of this approach is that it does not assume advanced knowledge of the route to be travelled, only that the vehicle is being driven in a specific geographic region. The objective is to determine a control policy which, on one hand, is responsive only to current operating conditions (as is the case for the conventional powertrain control strategy), but on the other hand, provides best on-average performance when travelling frequently in this region. In other words, a vehicle speed set-point is desired which achieves an optimal trade-off between expected average fuel economy and expected average travel speed. In this approach as described in the Kolmanovsky and McDonough papers cited above, the region's terrain and traffic properties are characterized in the transition probabilities of a Markov chain.

For probabilistic models with the Markov property, the next state of the process only depends on the current state of the process. The next state can be predicted using just the probability distribution of the current state and conditional probabilities of the transition between the current state and all possible next states. The transition probabilities can be assembled into a square matrix, called the Transition Probability Matrix (TPM), with the dimension equal to the number of states. Each row of this matrix corresponds to a specific state and contains the transition probabilities from this state to all other states. The transition probability between two states can be approximated from the observed frequencies of the transitions in the experimental data. The parameters to be modeled using the TPMs can be any that are used as inputs to the models for fuel efficiency, travel time, or other performance measures to be optimized. The modeled parameters may typically include road grade, vehicle speed, and vehicle acceleration. The formation of discrete Markov chains from continuously varying parameters may be done as described in Filev et al., "A Generalized Markov Chain Modeling Approach for On Board Applications," *The 2010 International Joint Conference on Neural Networks (IJCNN)*, pp. 1-8, July 2010.

Figure 4:
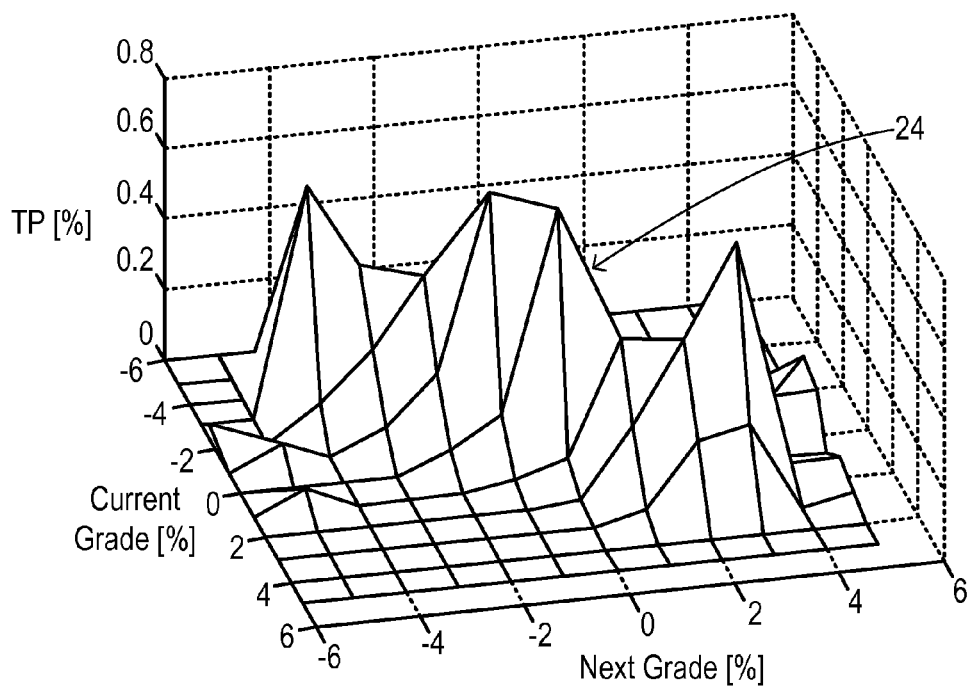
FIG. 4 is a three-dimensional graph depicting a transition probability model for road grade corresponding to highway driving in a particular region.
Figure 5:
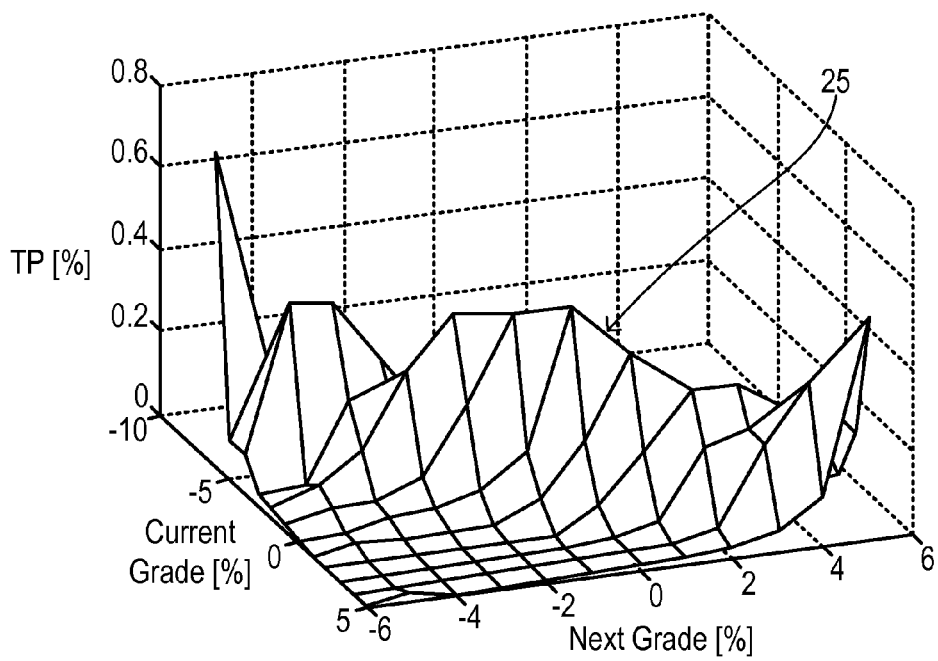
FIG. 5 is a three-dimensional graph depicting a transition probability model for road grade corresponding to city driving in a particular region.

FIGS. 4 and 5 illustrate example transition probabilities in the form of transition probability models (TPM) of road grade for a specific geographical region. FIG. 4 corresponds to road grade transition probabilities while driving on highways and FIG. 5 corresponds to road grade transition probabilities for city (i.e., non-highway) driving in the geographic region. Since the majority of transitions occur between states that are near each other, both TPMs generally show peaks coinciding with a vertical plane passing through the origin and having a slope of 1. Since (for this example) highway grades tend to be lower, TPM 24 in FIG. 4 has a relatively higher peak close to the origin as compared to TPM 25 in FIG. 5. TPMs 24 and 25 have previously been developed during test drives by test vehicles so that the data could be used to calculate on optimized control policy to be stored in a vehicle and used when driving in the corresponding region.

Figure 6:
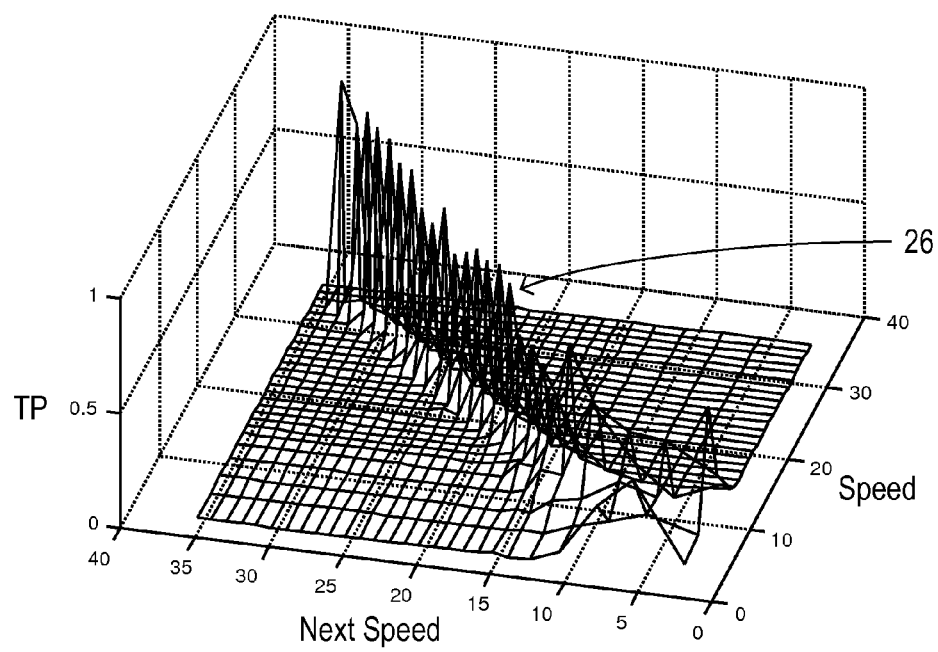
FIG. 6 is a three-dimensional graph depicting a transition probability model for vehicle speed during off-peak driving in a particular region.

FIG. 6 shows a TPM 26 showing transition probabilities between a current speed and a next speed based on data collected during an off-peak drive time (i.e., not during the rush hour). The resulting TPM would look different for data collected during times of a high traffic volume such as rush hour.

By combining TPMs for road grade, speed, and acceleration with models of vehicle performance (e.g., in terms of fuel economy and travel time), an optimized solution can be found which then defines a control policy to be used in operating the vehicle powertrain. For the goal of minimizing fuel consumption, a representative model relating the vehicle states and the fuel consumption is required. This model must provide a value for the fuel consumption as a function of the current and next states. The chosen model is of the following form, $$W_f = f(v, v^+, \theta, \theta^+)$$

where $W_f$ is the fuel consumption over some specified segment of distance or time (taken as a 30 meter segment in this example), where is the current vehicle speed, $v^+$ is the next vehicle speed (i.e., speed at the beginning of the next 30 meter segment), $\theta$ is the current grade, and $\theta^+$ is the next grade (i.e., grade at the beginning of the next 30 meter segment).

For analysis, the model can be identified from data using neural network training tools, such as the Neural Network Tool box provided by MATLAB, as represented by a 2-layer, 5-input, single output multilayer perceptron (MLP) feed forward neural network model of the form $$W_f = \sigma_2(w_2 \sigma_1(w_1 u + b_1) + b_2),$$

where $\sigma_1$ and $\sigma_2$ are hyperbolic and linear activation functions respectively, $w_2$ and $w_1$, $b_2$ and $b_1$ are the corresponding vectors of weights and biases of the hyperbolic and linear activation functions, and $u=(v, v^+, v^+ - v, \theta, \theta^+)'$ is the vector of TPM model inputs. The Bayesian regularization back propagation training function trainbr, available from the Neural Network tool box in MATLAB, can be applied for training the neural network model using the TPM data.

The dimensionality of stochastic dynamic programming is addressed by careful computational implementation of SDP iterations in "for loop" form in Matlab, and by retaining three primary states for the optimization: traffic speed, road grade, and control offset speed relative to traffic ($v_t$, $\theta$ and $u$, respectively). Note that the host vehicle velocity is given by $v = v_t + u$.

In the optimization, we assume $u \in \{-3, -2, -1, 0, 1, 2, 3\}$ m/s as the set of possible control actions. The fuel consumption model is averaged with respect to the next (one step ahead) values of traffic speed and road grade:

$$\overline{W}_f(v_t, \theta, u, u^+) = E_{v_t^+, \theta^+} f(v_t + u, v_t^+ + u^+, \theta, \theta^+),$$

where $u^+$ (next vehicle speed offset relative to traffic) is the decision variable (i.e., control variable). The approximation is justified given that the transition probability matrix for traffic speed is close to being diagonal. The transitional cost is of the form, $$R = \overline{W}_f + \lambda \overline{T}_t,$$

where $\overline{W}_f$ is the expected fuel consumption over a 30 meter segment, and $\overline{T}_t$ is the expected segment travel time estimated as $$\overline{T}_t(v_t, u, u^+) = E_{v_t^+}\left[\frac{v + v^+}{2\Delta s}\right]^{-1} = E_{v_t^+}\left[\frac{v_t + v_t^+ + u + u^+}{2\Delta s}\right]^{-1}.$$

The parameter $\lambda > 0$ is a weight used to trade off the fuel consumption versus the travel time.

The SDP problem can be solved numerically by using the value iteration approach. We determine a value function that approximately satisfies the Bellman equation $$V(v_t, \theta, u, \lambda) = \min_{u^+}[Q(\cdot)]v_t, \theta, u, u^+, \lambda),$$

where $$Q(v_t, \theta, u, u^+, \lambda) = R + q \sum_{v_t^+ \theta^+} V(v_t^+, \theta^+, u^+, \lambda) P(v_t^+, \theta^+ | v_t, \theta),$$

and q, $0 < q < 1$ is a discount factor. By assuming statistical independence of traffic speed and road grade, $$P(v_t^+, \theta^+ | v_t, \theta) = P(v_t^+ | v_t) P(\theta^+ | \theta).$$

The optimal control policy is a minimizer of the above, which is $$U^+(v_t, \theta, u, \lambda) \in \arg\min_{u^+} Q(v_t, \theta, u, u^+, \lambda).$$

The value function iterations have the following form, $$V_{n+1}(v_t, \theta, u, \lambda) = \min_{u^+} Q_n(v_t, \theta, u, u^+, \lambda).,$$

$$Q_n(v_t, \theta, u, u^+, \lambda) = R + \sum_{v_t^+ \theta^+} qV(v_t^+, \theta^+, u^+, \lambda) P(v_t^+, \theta^+ | v_t, \theta).$$

$$u^+ \in O(v_t, \theta, u).$$

$$V_0(v_t, \theta, u, \lambda) = 0.$$

with $O(v_t, \theta, u)$ denoting the set of feasible next speeds offsets. Under typical assumptions, the function will converge. The computational iterations are performed until a termination criterion $$\|V_{n-1}(\bullet) - V_n(\bullet)\| \leq CT,$$

is satisfied where CT is a defined convergence threshold.

A particular value of $\lambda$ may be selected for striking a desired tradeoff between optimizing fuel economy or travel time. Considerations involved in selecting a value are described in the Kolmanovsky et al IFAC paper cited above. A value of $\lambda = 0.002$ has been found to be appropriate. The value can alternatively be made configurable by the driver according to how aggressively the driver wants to be in obtaining the improved fuel economy.

For a vehicle to which the fuel consumption model applies, different control policies are generated corresponding to different driving conditions, such as rush hour (RH) traffic and off-peak (OP) traffic for a given region. These policies use the same fuel consumption model, but rely on different TPMs for traffic speed that are generated separately from RH and OP drive data, respectively.

Figure 7:
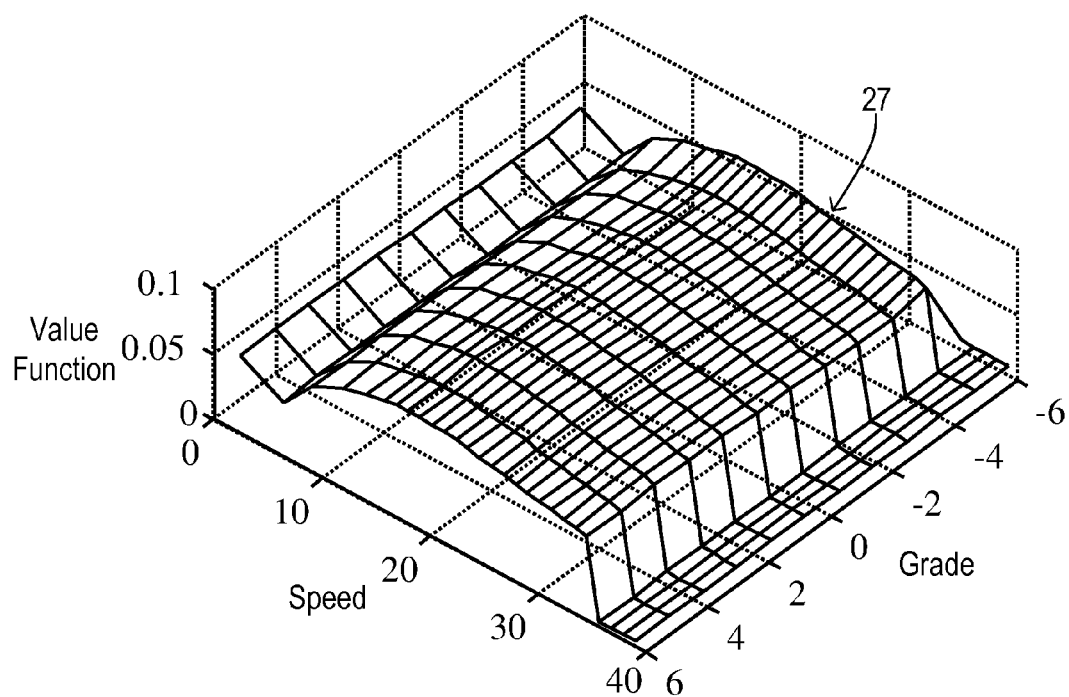
FIG. 7 is a three-dimensional graph depicting a value function for a particular set of driving conditions.
Figure 8:
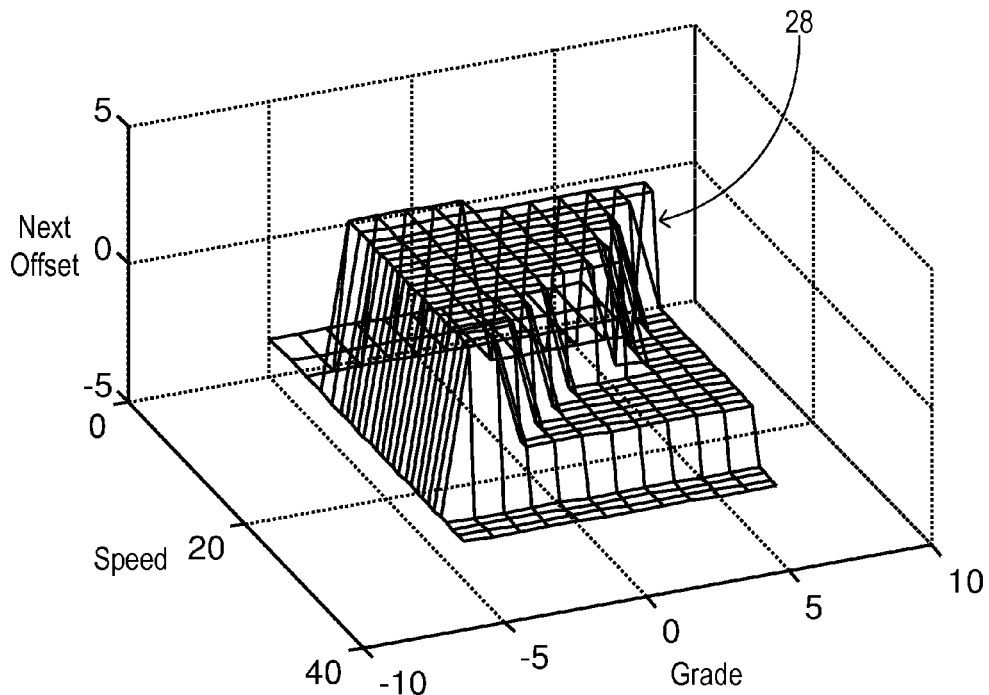
FIG. 8 is a three-dimensional graph depicting a control policy resulting from the value function of FIG. 7.

As a result of the above derivation, the value function optimizing the vehicle performance gives the control policies to be used when driving in the corresponding driving conditions. FIG. 7 shows a cross cut surface 27 (with u=0) of the value function that was produced for conditions including rush hour traffic and a grade for TPM of a selected region. The value function is a function of traffic speed (i.e., a reference speed of other traffic or a speed limit if no significant traffic is present), road grade, and traffic speed offset. FIG. 8 shows a cross cut surface 28 (with u=0) of a control policy implementing value function 27. According to this control policy, the next offset appears to have a "high" and a "low" value depending on what the current state is. The cross section in FIG. 8 is for a current offset equal to 0. A similar "high" and "low" value for the next offset is seen for each of the other current control offset swatches. A matrix of all mappings covering the range of speed offsets is stored as the control policy in the vehicle and can be used to periodically update a speed set-point to achieve the desired optimization of fuel economy and travel time.

In order to more fully account for the dynamic elements affecting fuel consumption, the cost models used in calculating an optimal control policy preferably include a representation of the vehicle transmission/torque converter and the speed control system operation. A torque filter structure may be applied to limit the rate of change of the policy's output. In addition, the policy can be constructed such that its output is a constrained speed offset request to be applied to the current vehicle speed.

As disclosed in the McDonough et al IEEE paper cited above, different driving conditions (i.e., in terms of city or highway driving, peak or off-peak times, and character of road grade) can be distinguished using the Kullback-Leibeler (KL) divergence which is a measure of the relative entropy between two probability distributions (e.g., transition probability models).

Given two probability distributions P and Q that represent, respectively, two random processes A and B, the KL divergence is a measure of the error if process B were to be estimated by probability distribution P.

For the two TPMs P and Q, the KL divergence is given by the following equation:

$$D_{KL}(P\|Q) = \sum \sum [P(x^+|x)P^+(x)]\log\left(\frac{P(x^+|x)}{Q(x^+|x)}\right)$$

where P* denotes the steady-state probability distribution of the TPM P, x and $x^+$ are the current and next states respectively, and the summations occur over all possible states. The distribution P* can be associated with the eigenvector of the matrix P corresponding to the eigenvalue of 1, i.e., $(P^*)^T P = (P^*)^T$ where $(P^*)^T$ denotes the transpose of P*.

The entries in Q can be assumed to be greater than zero if the corresponding entries of P are greater than zero. If Q is constructed using experimental data and does not satisfy this property, we replace it with $$Q_{reg} = (1-\epsilon)Q + \epsilon\left(\frac{1}{n}\right)E$$

where is a parameter between 0 and 1 (=0.0001 is used herein), n is the number of states in the TPM, and E is an n by n matrix of ones. In the replacement, a non-zero transition probability is guaranteed between any two states, even though this transition probability may be vanishingly small.

Note three properties of KL divergence:
1. The KL divergence is always non-negative;
2. KL(P,Q)=0 if, and only if, P=Q;
3. KL(P, Q)≠KL(Q, P), in general. That is, the KL divergence is not symmetric.

The closeness of KL divergence to zero is a measure of the expected error if using one TPM to predict the states evolving according to the transition probabilities of the other TPM. Thus, if current driving conditions are sufficiently close to those of a TPM for which an optimized control policy has been determined, then that control policy can be validly used to improve the performance under the current driving conditions.

Figure 9:
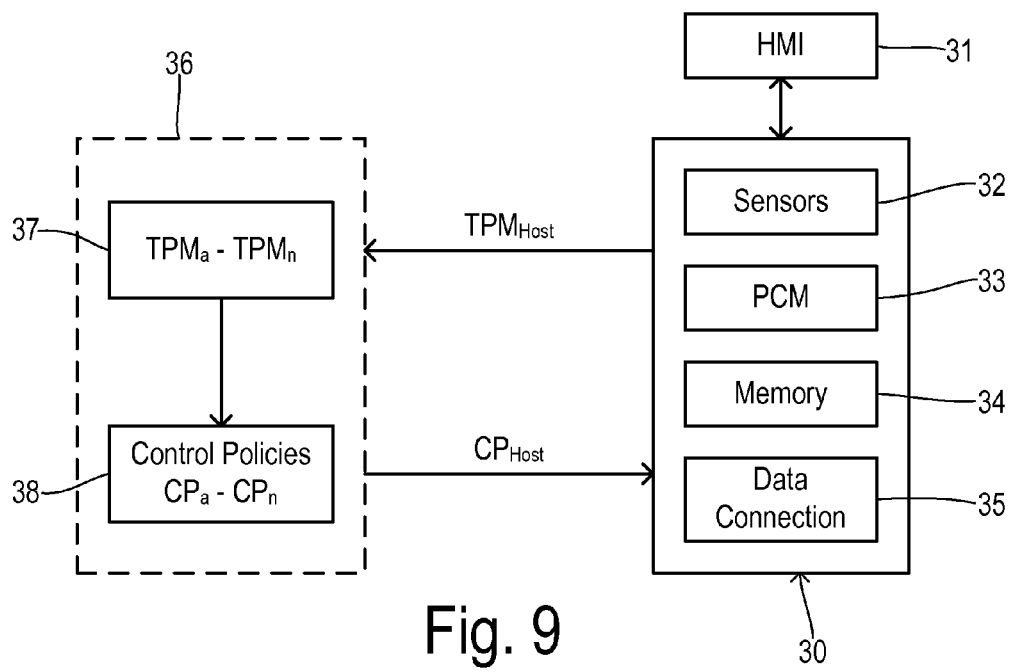
FIG. 9 is a block diagram showing a system in greater detail for performing a real-time, on-board selection and formation of appropriate control policies.

In order to create, identify, and utilize optimal control policies on board a vehicle that may be operated in various regions and under different driving conditions, the present invention utilizes a system as shown in FIG. 9. A vehicle control system 30 is coupled to a human machine interface (HMI) 31, and includes sensors 32, powertrain control module (PCM) 33, data memory 34, and an optional external data communication interface 35. A database 36, which may be on-board or off-board of the vehicle, includes a plurality of transition probability matrices 37 and a plurality of corresponding control policies 38. A current $TPM_{Host}$ of the host vehicle is used in conjunction with TPM database 37 in order to select or create a control policy $CP_{Host}$ for the host from control policy database 38. Sensors 32 include any devices necessary for characterizing the driving conditions associated with TPM selection/creation such as any necessary for characterizing road grade, time of day, vehicle speed, and/or traffic speed and density. Memory 34 may store databases 37 and 38 and/or may provide working memory when compiling data for constructing new TPMs during routine driving of the vehicle. As described in more detail below, once sufficient data exists to create a host TPM ($TPM_{Host}$), then it may be compared using KL divergence with a plurality of transition probability models $TPM_a$ through $TPM_n$. If a matching TPM is found, a corresponding control policy $CP_a$ through $CP_n$ is used to select a host control policy $CP_{Host}$ to use in optimizing a speed control during the routine driving for which the selected TPM holds true.

Figures 10, 11:
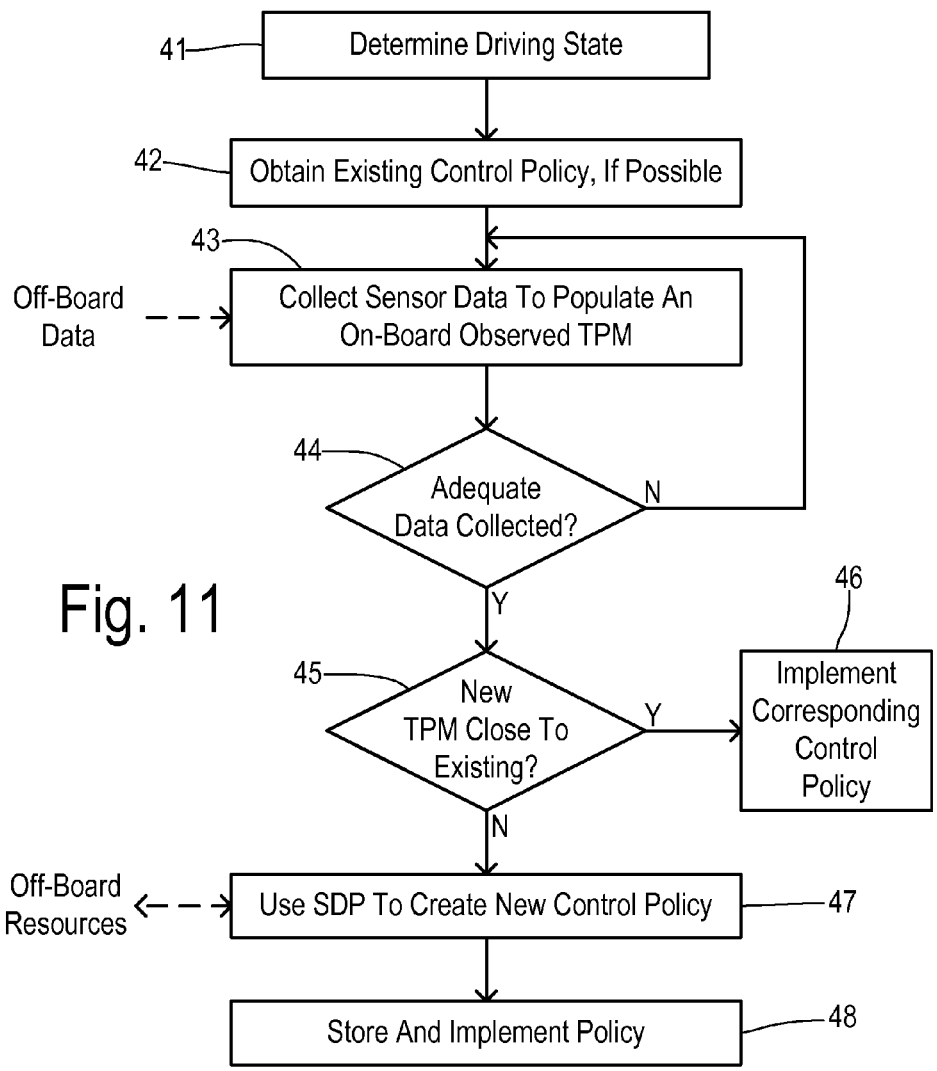
FIG. 10 depicts a database index for identifying sets of driving conditions each having a distinct control policy.
FIG. 11 is a flowchart showing a first embodiment of an on-board method of the present invention.

FIG. 10 shows some preferred dimensions that can be used for defining a driving state to be represented in a particular transition probability model. A table 40 includes columns for each respective dimension, including geographic region, city/highway driving, time of day, vehicle type, and follow distance behind lead vehicle (i.e., aggressive or passive driving style). Each row in table 40 contains a particular value for each of the dimensions (i.e., defines a driving state which is used as an index to a respective TPM). Thus, a first row corresponds to the geographic region being a City A, the type of driving being City driving, the time of day being rush hour, the particular vehicle model being Model Z, and the target following distance being expressed as C seconds. Some of the dimensions may be constant for a particular control unit such as a vehicle type. Others may be measured on-board the vehicle using sensors, and some such as geographic region and time of day may be selected manually by the vehicle operator, or may be determined in response to other variables (e.g., following distance which may be determined based on the user selection of a desired vehicle spacing or may be calculated by the controller according to variables such as traffic density or time of day). Each particular row in table 40 identifies a corresponding TPM which may already be contained within a stored database or may be constructed in real time onboard a vehicle.

One preferred method of the invention is shown in FIG. 11 wherein a current driving state of the vehicle is determined in step 41. This determination is based on identifying each of the dimensions such as time of day and geographic region in order to try to identify an applicable TPM. If a TPM exists for the current driving conditions, then a corresponding control policy is obtained in step 42. Thus, optimization of the fuel economy can begin as soon as an appropriate control policy is found.

Whether or not the current driving state has a respective TPM, an onboard observed TPM is populated with collected sensor data in step 43 so that the TPM database can be refined and/or expanded over time. The building up of the onboard TPM database may include off-board data obtained by the vehicle from a centralized database location. This database may include transition events for the matching driving state (i.e., same region, time of day, etc.) determined by other consumers' vehicles or by the vehicle manufacturer using test vehicles. If a control policy has not already been identified for the current driving state, a check is made in step 44 to determine whether adequate TPM data has been collected. If not, then a return is made to step 43. Once adequate data has been collected, a check is performed in step 45 to determine whether the TPM is close to an existing TPM in the database. The check for similarity is based on the KL divergence described above. If the KL divergence is sufficiently small with another existing TPM, then a control policy corresponding to that similar TPM is implemented in step 46. If there is no existing control policy sufficiently close to the current driving state, then stochastic dynamic programming is used in step 47 to create a new control policy according to the optimization process described above. Sufficient computing resources can be provided on vehicle to perform the optimization or off-board resources can be used if wireless data communication is available in the vehicle. Once a new control policy is created, it is stored and implemented in step 48.

To summarize the method, after a vehicle system checks its GPS coordinates and the time of day, it locates an appropriate control policy to use. Once the policy is found, the vehicle will load it and begin to use it. The vehicle will read in current vehicle speed, road grade, and relative distance between it and a leading traffic vehicle, and, using the policy, will decide on a speed adjustment to make in order to obtain improved fuel economy. Using its current offset from the traffic (calculated as the difference between the lead vehicle and the host vehicle speed) to determine a next command traffic speed offset as specified by the control policy, the system determines the necessary input to supply to the vehicle throttle control to obtain the specified speed offset.

Figure 12:
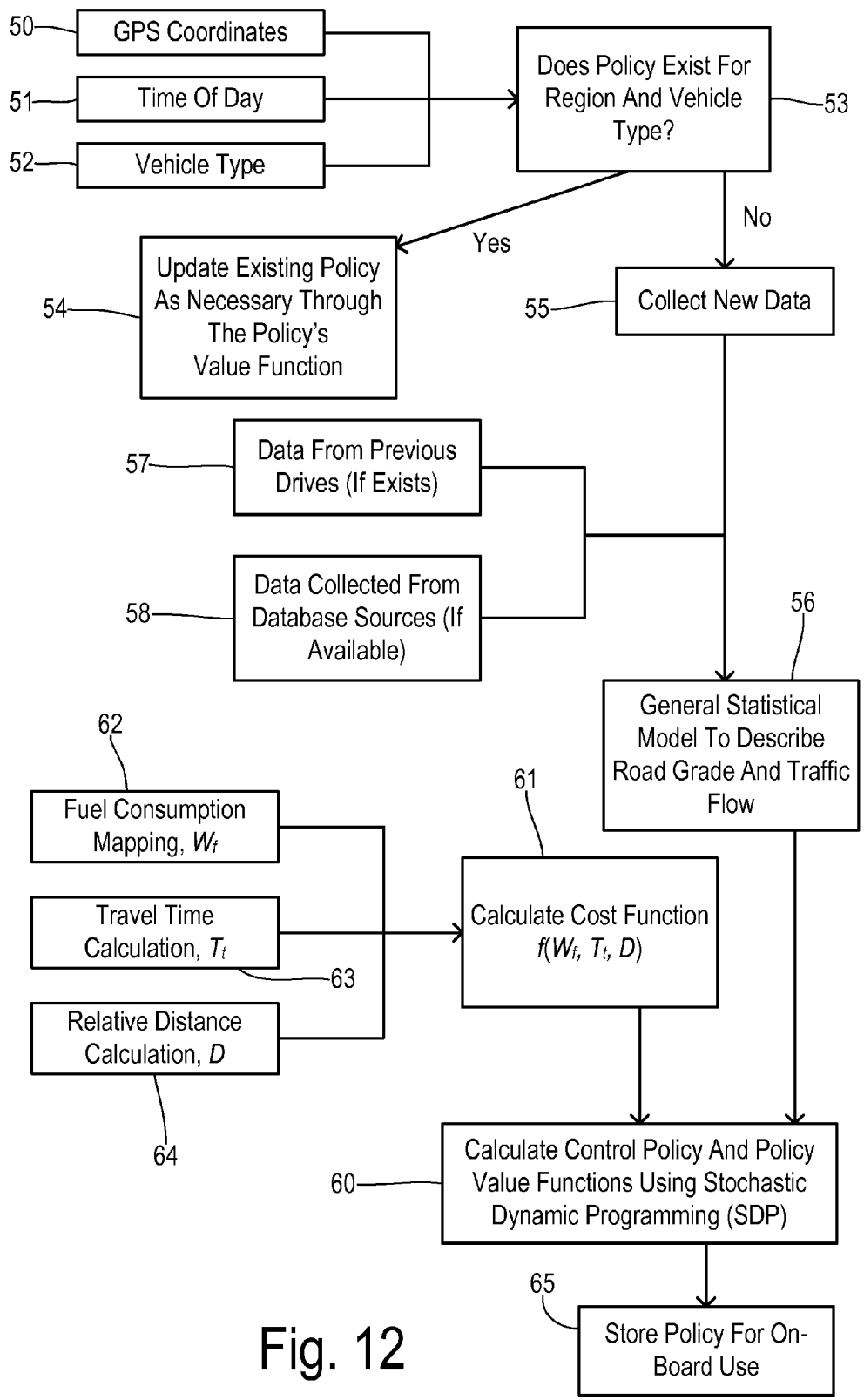
FIG. 12 is a flowchart showing a method of the invention in greater detail.

An embodiment of a general process by which an actual control policy may be computed and refined onboard a vehicle according to the driving state (e.g., a given location and time of day) is shown in FIG. 12. In steps 50-52, the system looks at where the vehicle is, what the time of day is, and what type of vehicle it is. This provides a means to reference and index the control policies for later use. The system then checks whether or not a control policy already exists for these conditions in step 53. If the policy does exist, then the system will load this policy in step 54 and update it if necessary. Such updating essentially checks how accurate the TPM is for the given region. If, for example, a TPM already exists for the region but it was developed with a set of data that was not particularly rich (e.g., not enough grade information or the traffic patterns in the given region have shifted over time) then the existing TPM can be expanded with new data collected on-board the vehicle. After the TPM is updated, a new control policy would then have to be calculated.

When no policy currently exists for a given region, time of day, and vehicle type, the system will collect data regarding the terrain is step 55. This data will be used to calculate the grade along a route and then the grade will be used to generate statistical models that stochastically represent the grade in step 56. If previously collected data (from step 57) or data from an online database (from step 58) are available, this data will be incorporated into the current data and will be used in generating the statistical model in step 56. Once the statistical model is generated, the next step is to calculate the control policy and the value function associated with the control policy. In order to do this, a cost function is calculated in step 61 as a function of fuel consumption mapping $W_{fs}$ travel time $T_{fs}$ and relative distance D between the following host vehicle and the leading traffic vehicle from steps 62-64, respectively.

The fuel consumption mapping is itself a function of vehicle speeds and road grade. With the accurate cost function, a control policy is calculated using stochastic dynamic programming in step 60. The policy will be indexed by current road grade, current vehicle speed, and current relative distance. The policy output is preferably generated as an offset from the current traffic speed. After calculating the control policy, it is stored for later use in step 65.

Figure 13:
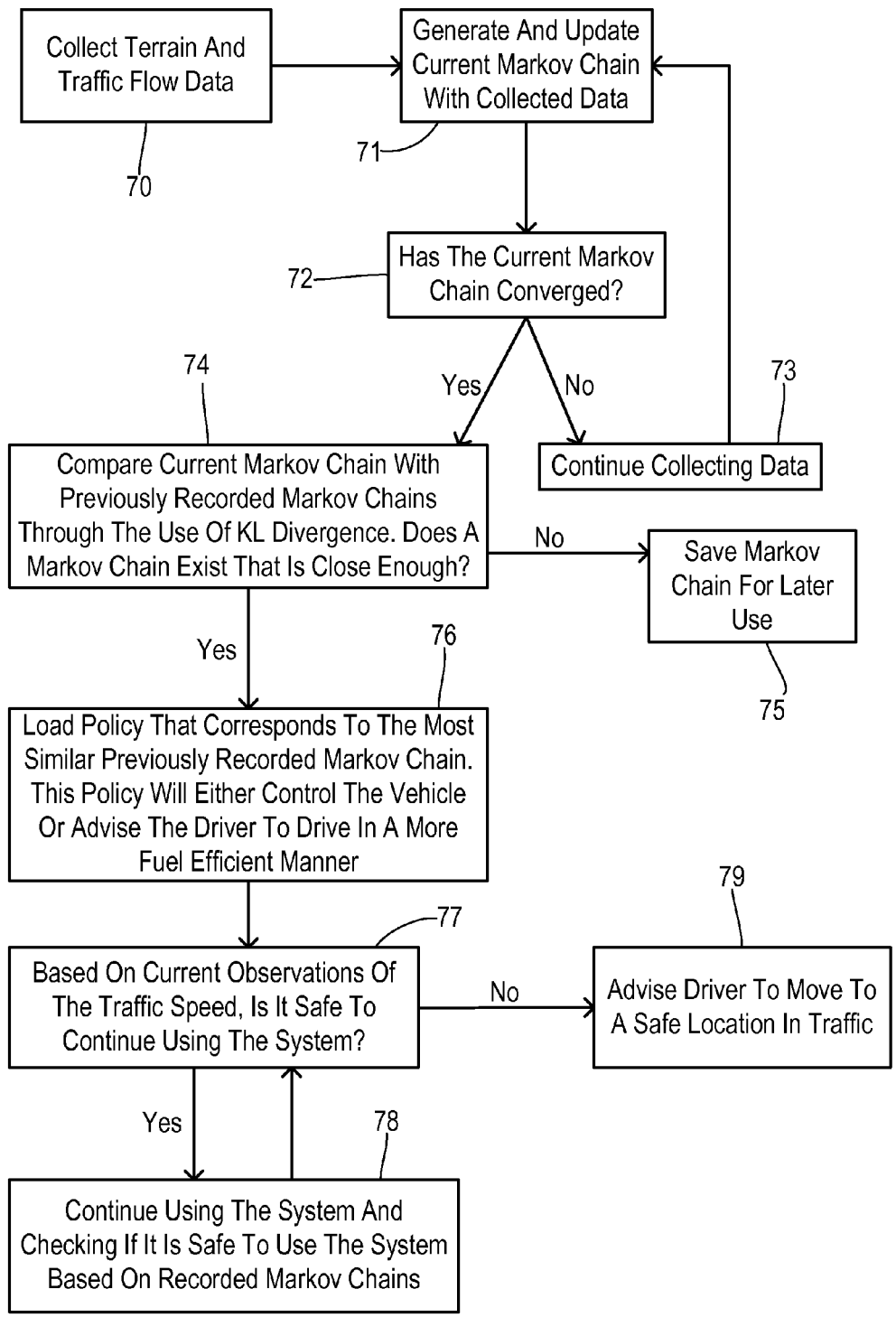
FIG. 13 is a flowchart showing a method for data collection and control policy implementation in greater detail.

The on-line learning of Markov chains and the evaluation of KL divergence of TPM data is shown in greater detail in FIG. 13. In step 70, the vehicle collects terrain and traffic flow data. In real-time, the vehicle system generates and updates Markov chains from this data in step 71. Before it begins comparing these new chains to previously recorded chains, the data must stabilize and converge. To check convergence, the vehicle system will periodically compare current versions of the Markov chain with older versions of itself in step 72 using the Kullback-Leibler (KL) divergence. When the KL divergence is sufficiently small, the chain will have converged. If the chain has not converged, the vehicle will continue collecting data in step 73 and check for convergence at a later time.

Once the chain has converged, the vehicle system will again use the KL divergence in step 74 to see if this new chain has a similarity to any previously recorded Markov chains on-board the vehicle. If there is a chain that is suitably similar (e.g., the divergence is less than a threshold), the vehicle system will load this chain and the associated control policy or policies in step 76. If no chain exists that is suitably similar, the vehicle will save this chain for use at a later time in step 75.

Once a control policy is loaded and is being implemented, the vehicle will assess whether the traffic flow is continuing to be regularly predictable and is, in fact, safe for using the policy in step 77. The required regularity may be detected according to the accelerations of the surrounding traffic vehicles and comparing the predicted output from the vehicle speed Markov models to the actual vehicle speeds of the traffic flow. If the traffic vehicles are accelerating a lot, this could indicate a traffic flow that is not statistically regular and could, perhaps, be a problem for operating this system in. Likewise, if the traffic speed is not consistent with what the Markov model is predicting, this could indicate that the traffic pattern has shifted over time or that the initial collection of the data was not sufficiently rich to properly model the traffic dynamics. Basically, if traffic is behaving out of the ordinary (due to an accident, construction, etc) that is affecting what would be considered the statistically regular flow, then this system might not accurately predict what traffic will do next. If the traffic flow continues to be safe, the policy will continue to be implemented in step 78 and periodic safety checks will be made. If the traffic flow is potentially not safe for using the control policy, the driver will be advised to move to a safer location in the traffic flow in step 79.

A further method of onboard learning of Markov chain models as transition probabilities are collected in real time is disclosed in co-pending application U.S. Ser. No. 13/777, 100, filed Feb. 26, 2013, entitled Road Grade Auto-Mapping, which is incorporated herein by reference.

Figure 14:
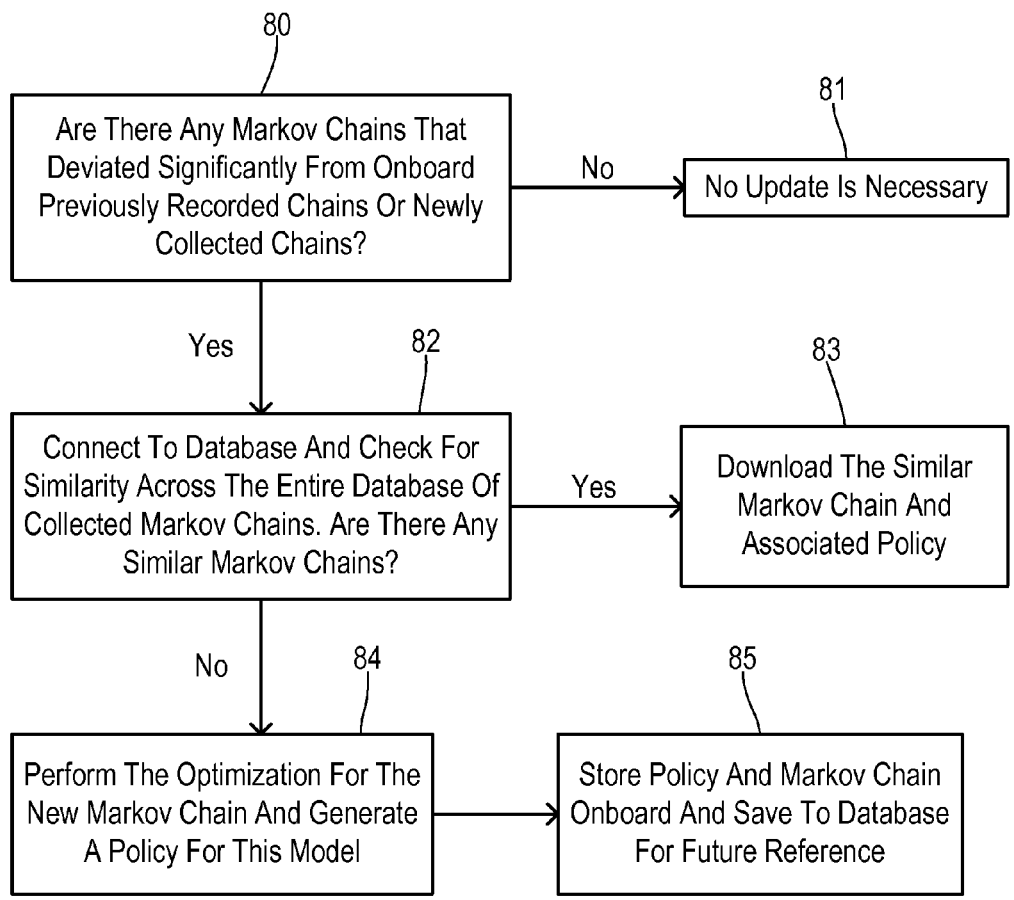
FIG. 14 is a flowchart showing the comparison of transition probability models in greater detail.

FIG. 14 shows one embodiment of a general method for updating both the centralized TPM (Markov chain) database and the vehicle control system in the event that a full-time data connection is not available in the vehicle. When the vehicle is at a designated update station and the vehicle has newly compiled Markov chains stored in it, data flows from the vehicle to the centralized database. Any new, relevant control policies would flow from the central database to the vehicle at the same time. The designated update station can be a dealership when servicing the vehicle or can be the driver's home or any other location where a LAN connection can be made with the vehicle system so that it can connect to the central database.

Once the vehicle is at a designated update station, it will assess in step 80 whether an update is necessary (i.e., whether there are any new Markov chains stored on the vehicle). If not, then no update will take place as shown in step 81. If yes, the vehicle will connect with the database in step 82. Once a connection is established, the vehicle will check for similarity between the new chain or chains with the chains stored on the database. If suitably similar chains exist, the vehicle will download these chains and the control policies associated with them in step 83. If there are no suitably similar Markov chains, the central database will save the new chain and then may perform an optimization for the new statistical model in step 84. The resulting new control policy is downloaded to the vehicle in step 85 while also saving the policy in the central database for sharing with other vehicles that subsequently perform routine driving in the same driving state (e.g., region, time of day, vehicle type).

Figure 15:
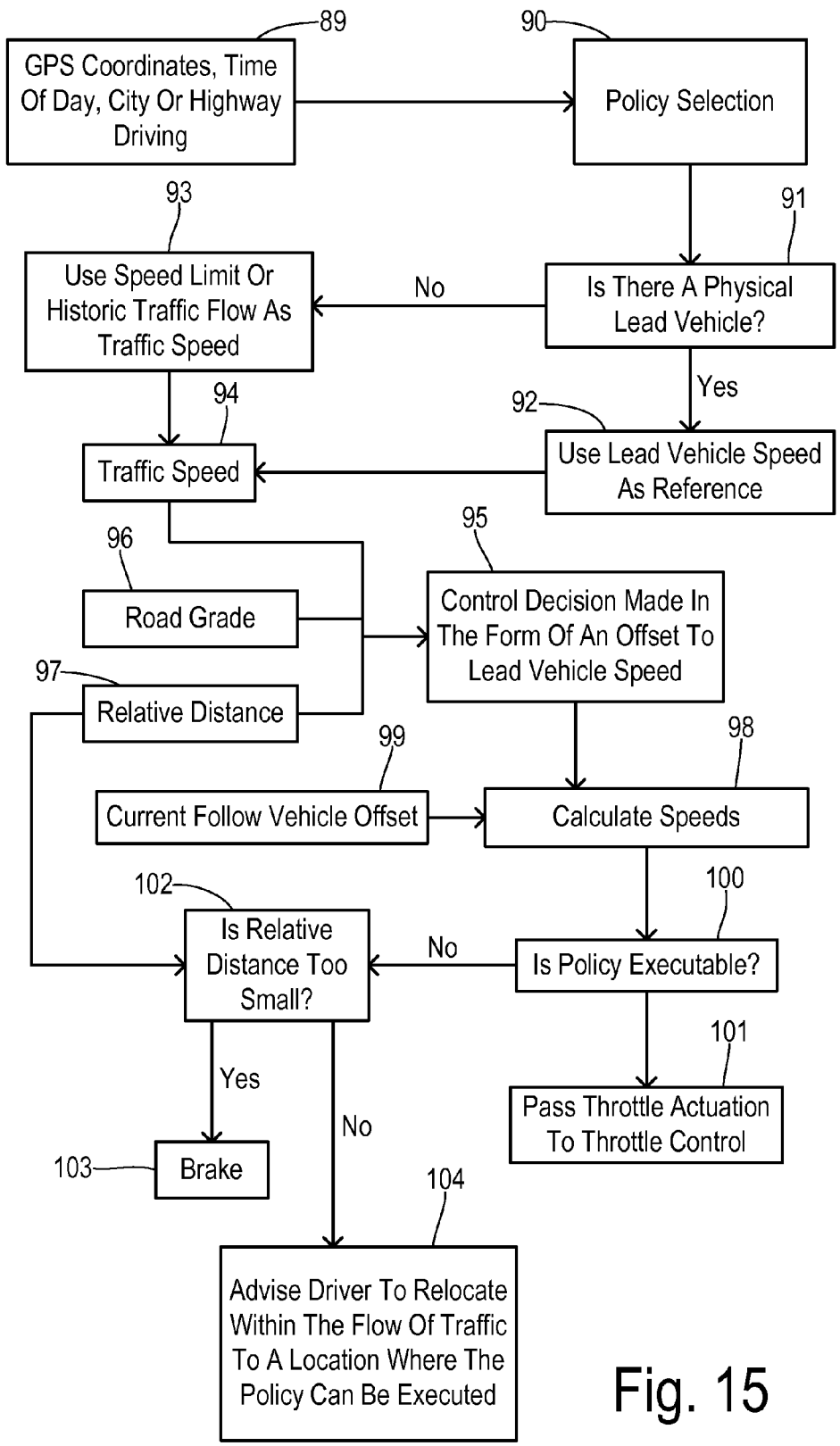
FIG. 15 is a flowchart showing control policy execution in greater detail.

One preferred embodiment of in-vehicle, real-time execution of a control policy is shown in greater detail in FIG. 15. The vehicle checks its GPS coordinates, time of day, and city or highway driving conditions in order to find the appropriate policy to use in steps 89 and 90. Once the policy is found, the vehicle will load it and begin to use it. The vehicle system then checks to see if there is a physical lead vehicle in front of it in step 91. This check may preferably be made regardless of whether the vehicle has an adaptive cruise control engaged, because even if the speed is not being actively controlled it may still be desirable to provide messages to the driver to inform them of actions that could be taken to improve their fuel economy. If a lead vehicle is present, the vehicle system will adopt the lead vehicle's speed as the traffic speed in step 92. If no lead vehicle is present (or the vehicle does not have a sensor for detecting a lead vehicle), then in step 93 the vehicle system uses a driver-specified speed setpoint, historical data for the traffic speed, or the posted speed limit if no driver-specified setpoint or historical data are available. In step 95, the vehicle will then read in the current traffic speed from step 94, road grade from step 96, and relative distance (between the following host vehicle and the leading traffic vehicle) from step 97. Using the selected control policy, the system determines in step 95 the next speed offset to be executed or suggested to the driver.

The vehicle system uses its current offset from traffic from step 99 (calculated as the difference between the lead vehicle speed and the follow vehicle speed) together with the commanded traffic speed offset given by the policy in step 95 in order to calculate an input for the vehicle's speed control in step 98. Before sending this input to the speed control, the system controller will first gauge whether this action is executable (i.e., ensures that the speed offset falls within safe boundaries) in step 100. The decision may be based on an arbitration algorithm that evaluates the outcome of the SDP optimization algorithm with respect to safety and feasibility rules and thresholds so that the resulting vehicle travel will not violate any distance constraints for vehicle separation. If the action is safe, a corresponding command will be sent to the throttle control in step 101.

If the action is not safe, the input will be held and the vehicle will attempt to deduce why this action would be unsafe to pursue. There are two potential reasons why this action would not be safe to pursue. The first case is the relative distance between the lead and follow vehicles (i.e., either the current distance or the expected distance after actuating this command will be too short)—which is detected in step 102. If this is the case, the vehicle will apply the brakes in step 103 so that it moves to a safe distance. The second case is when the traffic flow is not moving according to the predictions made by the current statistical model of the traffic flow (such as due to road construction, an accident, an inaccurate model, or anything other factor that would change the flow of traffic). If this is the case, the vehicle advises the driver in step 104 to relocate to a safer area of the traffic flow or to wait for the traffic flow to become statistically regular to return to using the policy output.

What is claimed is:

1. Vehicle apparatus comprising:
a speed control for adjusting a vehicle powertrain of the vehicle in response to a speed setpoint; and
an optimizer for selecting a control policy to periodically generate speed adjustments for applying to the speed setpoint to operate the vehicle powertrain at increased efficiency, wherein the control policy is based on a value function providing an optimized solution for a cost model and a transition probability model, wherein the transition probability model corresponds to a driving state defined according to a plurality of dimensions including a time-of-day dimension and a geographic region dimension, wherein the transition probability model and the control policy have inputs based on road grade and speed, wherein the optimizer collects road grade data during routine driving of the vehicle to construct an observed transition probability model and uses divergence between the observed transition probability model and a set of predetermined transition probability models to identify a control policy for use during the routine driving.

2. The vehicle apparatus of claim 1 wherein the speed control automatically modifies the speed setpoint in response to the periodically generated speed adjustments.

3. The vehicle apparatus of claim 1 wherein the optimizer provides a speed adjustment advisory to an operator of the vehicle in response to the periodically generated speed adjustments.

4. The vehicle apparatus of claim 1 wherein the plurality of dimensions further includes a predetermined following distance.

5. The vehicle apparatus of claim 1 wherein the control policy further includes an input based on a relative following distance from traffic.

6. The vehicle apparatus of claim 1 wherein the optimizer includes a database of control policies corresponding to respective driving states, and wherein the optimizer selects the control policy according to a KL divergence between the observed transition probability model and predetermined transition probability models associated with each of the respective control policies.

7. A method of controlling a speed setpoint of a speed control for a vehicle, comprising the steps of:
collecting road grade and vehicle speed data during routine operation of the vehicle;
repeatedly updating an observed transition probability model for the road grade and vehicle speed as the data is collected;
detecting convergence between different updates of the observed transition probability model;
determining respective divergences between the converged observed model and a plurality of predetermined transition probability models in order to identify a predetermined transition probability model for which a divergence is less than a threshold;

retrieving a predetermined control policy corresponding to the identified predetermined transition probability model, wherein each predetermined control policy represents an optimized value function for reducing a cost function of operating the vehicle under a driving state corresponding to the identified predetermined transition probability model; and applying the control policy to identify offsets to the speed setpoint in the speed control in response to an instantaneous road grade and vehicle speed.

8. The method of claim 7 wherein the control policy is further optimized to provide a predetermined following distance.

9. The method of claim 7 wherein convergence of the observed transition probability model is detected in response to KL divergence between the different updates being less than a convergence threshold.

10. The method of claim 7 wherein the divergences between the observed transition probability model and each of the predetermined transition probability models are detected in response to KL divergence.

11. The method of claim 7 further comprising the step of automatically modifying the speed setpoint of the speed control in response to the identified offsets.

12. The method of claim 7 further comprising the step of generating a speed adjustment advisory to an operator of the vehicle in response to the identified offsets.

13. Vehicle apparatus comprising:

a speed control for operating the vehicle at a speed setpoint; and an optimizer for selecting a control policy that periodically generates speed adjustments for applying to the speed setpoint to operate at an increased average efficiency, wherein the control policy is valid for vehicle driving conditions characterized by a corresponding transition probability model, wherein the transition probability model and the control policy have inputs based on road grade and speed, wherein the optimizer collects operating condition data during routine driving of the vehicle to construct an observed transition probability model that corresponds to a driving state defined according to a plurality of dimensions including a geographic region dimension, and wherein the optimizer compares the observed transition probability model to a set of predetermined transition probability models each having a corresponding control policy in order to identify the control policy to be used during the routine driving.

14. The vehicle apparatus of claim 13 wherein the speed control is comprised of a driver-operated pedal, and wherein the speed adjustments are presented to a driver as a recommendation to the speed setpoint being maintained by the driver via the pedal.

15. The vehicle apparatus of claim 13 wherein the speed control is comprised of an automatic cruise control, and wherein the speed adjustments are applied to the speed setpoint being maintained by the automatic cruise control.

* * * * *